(12) United States Patent
Craft et al.

(10) Patent No.: US 9,164,676 B2
(45) Date of Patent: Oct. 20, 2015

(54) STORING MULTI-STREAM NON-LINEAR ACCESS PATTERNS IN A FLASH BASED FILE-SYSTEM

(75) Inventors: David Jones Craft, Wimberly, TX (US); Hubertus Franke, Cortlandt Manor, NY (US); Gokul Bhargava Kandiraju, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 970 days.

(21) Appl. No.: 13/308,195

(22) Filed: Nov. 30, 2011

(65) Prior Publication Data

US 2013/0138867 A1 May 30, 2013

(51) Int. Cl.
*G06F 12/00* (2006.01)
*G06F 3/06* (2006.01)
*G06F 12/02* (2006.01)

(52) U.S. Cl.
CPC .............. *G06F 3/061* (2013.01); *G06F 3/0659* (2013.01); *G06F 3/0679* (2013.01); *G06F 12/0246* (2013.01); *G06F 2212/7201* (2013.01)

(58) Field of Classification Search
CPC ... G06F 12/0246; G06F 3/061; G06F 3/0659; G06F 3/0679; G06F 2212/7201
See application file for complete search history.

(56) References Cited

U.S. PATENT DOCUMENTS

| | | | |
|---|---|---|---|
| 5,682,497 A * | 10/1997 | Robinson | 711/103 |
| 6,542,971 B1 * | 4/2003 | Reed | 711/147 |
| 7,127,551 B2 | 10/2006 | Beck | |
| 7,139,199 B2 | 11/2006 | Srinivasan et al. | |
| 7,631,138 B2 * | 12/2009 | Gonzalez et al. | 711/103 |
| 7,788,441 B2 | 8/2010 | Lee et al. | |
| 7,844,772 B2 | 11/2010 | Moon et al. | |
| 7,877,539 B2 | 1/2011 | Sinclair et al. | |
| 8,595,420 B2 * | 11/2013 | Chang | 711/103 |
| 2002/0004878 A1 * | 1/2002 | Norman | 711/103 |
| 2003/0204675 A1 * | 10/2003 | Dover et al. | 711/137 |
| 2003/0229753 A1 | 12/2003 | Hwang | |
| 2003/0233513 A1 * | 12/2003 | Ezoe | 711/103 |
| 2004/0186946 A1 | 9/2004 | Lee | |
| 2005/0055532 A1 * | 3/2005 | Yu | 711/203 |
| 2005/0286306 A1 | 12/2005 | Srinivasan et al. | |
| 2006/0004950 A1 | 1/2006 | Wang et al. | |
| 2006/0036802 A1 | 2/2006 | Drukin | |
| 2006/0168392 A1 | 7/2006 | Hwang | |
| 2007/0106849 A1 * | 5/2007 | Moore et al. | 711/137 |

(Continued)

*Primary Examiner* — Cheng-Yuan Tseng
*Assistant Examiner* — Ramon A Mercado
(74) *Attorney, Agent, or Firm* — August Law, LLC; George Willinghan (57) ABSTRACT

Accesses to logical pages of memory are monitored. Each logical page corresponds to a logical memory address and the accesses defining an access pattern. The logical memory addresses are logged in ordered pairs of consecutive logical pages in the access pattern. Upon receipt of a request to write data to a given logical page, a given ordered pair of consecutive logical pages containing the logical memory address of the given logical page as a first logical memory address in the ordered pair of logical memory addresses associated with that consecutive pair is obtained. A first physical memory address mapping to the first logical memory address is identified, and a second logical memory address from that identified consecutive pair. A second physical memory address mapping to the second logical memory address is identified, and the data and the second physical memory address are written to the first physical memory address.

19 Claims, 4 Drawing Sheets

(56) References Cited

U.S. PATENT DOCUMENTS

| | | |
|---|---|---|
| 2007/0233941 A1 | 10/2007 | Lee et al. |
| 2008/0002469 A1* | 1/2008 | Ishimoto ............... 365/185.17 |
| 2008/0082729 A1 | 4/2008 | Moon et al. |
| 2008/0184006 A1* | 7/2008 | Moon et al. ................ 711/205 |
| 2008/0276036 A1* | 11/2008 | Van Acht et al. ........... 711/103 |
| 2010/0100665 A1* | 4/2010 | Lin ............................. 711/103 |
| 2010/0138592 A1 | 6/2010 | Cheon |
| 2011/0055464 A1 | 3/2011 | Moon et al. |
| 2011/0145502 A1 | 6/2011 | Joshi et al. |

* cited by examiner

STORING MULTI-STREAM NON-LINEAR ACCESS PATTERNS IN A FLASH BASED FILE-SYSTEM

FIELD OF THE INVENTION

The present invention relates to flash memory systems.

BACKGROUND OF THE INVENTION

Flash memory, which is a type of non-volatile computer readable memory that can be electrically programmed and erased, is used to store data persistently for embedded systems, personal computers and enterprise systems. A flash file-system accesses and stores data on flash memory and provides the operating system (OS) with file-system interfaces to read and to write to flash memory. For read and write operations, the flash file-system sends commands and data to the flash controller, which retrieves or stores the data into the flash memory. Thus, a flash file-system interacts with the flash controller, which interfaces with the flash memory, which can be implemented in a flash memory device. Flash memory is typically read and written in pages with each page having a size of 2K or 4K bytes. In addition, each page is associated with a 'spare area' that has a size of 32 or 64 bytes. The standard use for the spare area is to store information such as ECC (Error Correction Codes), Logical Page numbers and Erase counts, among other information. This spare area and the actual data area are read and are written together from flash memory by the flash controller (and by flash file-system)

File-systems make use of access pattern information. For example, sequential/strided access patterns may be detected by a monitoring unit of the file-system and used for optimizations such as pre-fetching. However, non-linear/non-strided access patterns are typically not captured. Capturing such information requires additional memory and extra storage space. For non-linear/non-strided patterns, making the captured access information persistent is very useful as this does not require the re-construction of information every time after a system re-start. In addition, multi-stream information is usually not captured by the file-systems. This may require maintaining multiple 'possible next accesses' for a particular access, resulting in larger memory and storage overhead.

Therefore, both flash file-systems and traditional file-systems do not provide ways to capture non-linear/non-strided patterns of memory accesses or multiple streams of memory accesses. Having persistent, multiple stream access information for non-linear/non-strided patterns is not only useful for the flash file-system for optimizations such as pre-fetching but can also be used by other tools for pattern analysis and mining.

SUMMARY OF THE INVENTION

Systems and methods in accordance with exemplary embodiments of the present invention provide for the capture and persistence of non-linear and non-strided patterns in a file system of a memory system used in association with one or more computing systems. Any suitable memory device that is controlled by a file system and controller can be used in accordance with the present invention including optical and magnetic memory devices. Preferably, the memory device is a solid-state, non-volatile memory device such as a flash memory device. The flash memory device can be located internal to a computing system or can be external to the computing system, for example in a flash drive or other portable flash memory device. Non-liner access patterns refer to patterns of access, such as read and write accesses, to the logical memory addresses in a virtual memory of the computing system by applications running on that computing system that do not progress linearly through the addresses in the virtual memory. These accesses can jump around through the addresses in the virtual memory, e.g., following an address pattern of 1, 5, 9, 4, 3, 10, etc. Non-strided access patterns refer to patterns of access, such as read and write accesses, to the logical memory addresses in a virtual memory of the computing system by applications running on that computing system that do not progress through the addresses in the virtual memory with a constant stride length, e.g., one address at a time. These accesses can jump around through the addresses in the virtual memory following an address pattern where the space between adjacent addresses in the pattern varies. In addition to non-linear and non-strided accesses patterns, the present invention can accommodate a plurality of simultaneous access patterns through the logical memory addresses of the host computing system. In one embodiment, each one of the plurality of accesses patterns is associated with one of a plurality of applications running on the host computing system.

Exemplary embodiments in accordance with the present invention store information about multi-stream, non-linear and non-strided access patterns in the physical addresses or pages of a given physical memory system. Therefore, standard write operations to the memory system can be used to store the access pattern information, and standard read operations can be used to retrieve the access information. Using standard read and write operations eliminates the need for additional steps, such as separate read and write steps or the creation or meta-data, that consume bandwidth and processing resources in the computing system. When the memory system is flash memory, the access pattern information is stored in a flash memory page. Preferably, the multi-stream, non-liner, non-strided access information is stored in the flash memory page spare area, i.e., the spare area associated each flash page. The stored access information includes information about the 'possible next pages', i.e., the next physical address in the memory system, that may be accessed. This information is used to improve performance of the computing system and memory, e.g., by using techniques like pre-fetching, or for other pattern analysis techniques. Both the capture and persistence of this information is accomplished without consuming extra storage space or bandwidth overhead.

Since the flash file system reads and writes to the pages of the flash memory including the spare area during regular read operations, multi-stream, non-linear and non-strided access patterns are captured and persisted without consuming additional bandwidth within the computing system. In addition, the access pattern information becomes persistent without requiring any additional storage on the memory device since the spare area will be written back to the flash memory. In addition, the present invention provides a hint about the next access immediately at computing system start-up when a page is read from the memory device by looking, for example, at the spare area of that page without needing to wait for 'reconstruction' of the information.

DETAILED DESCRIPTION

Figure 1:
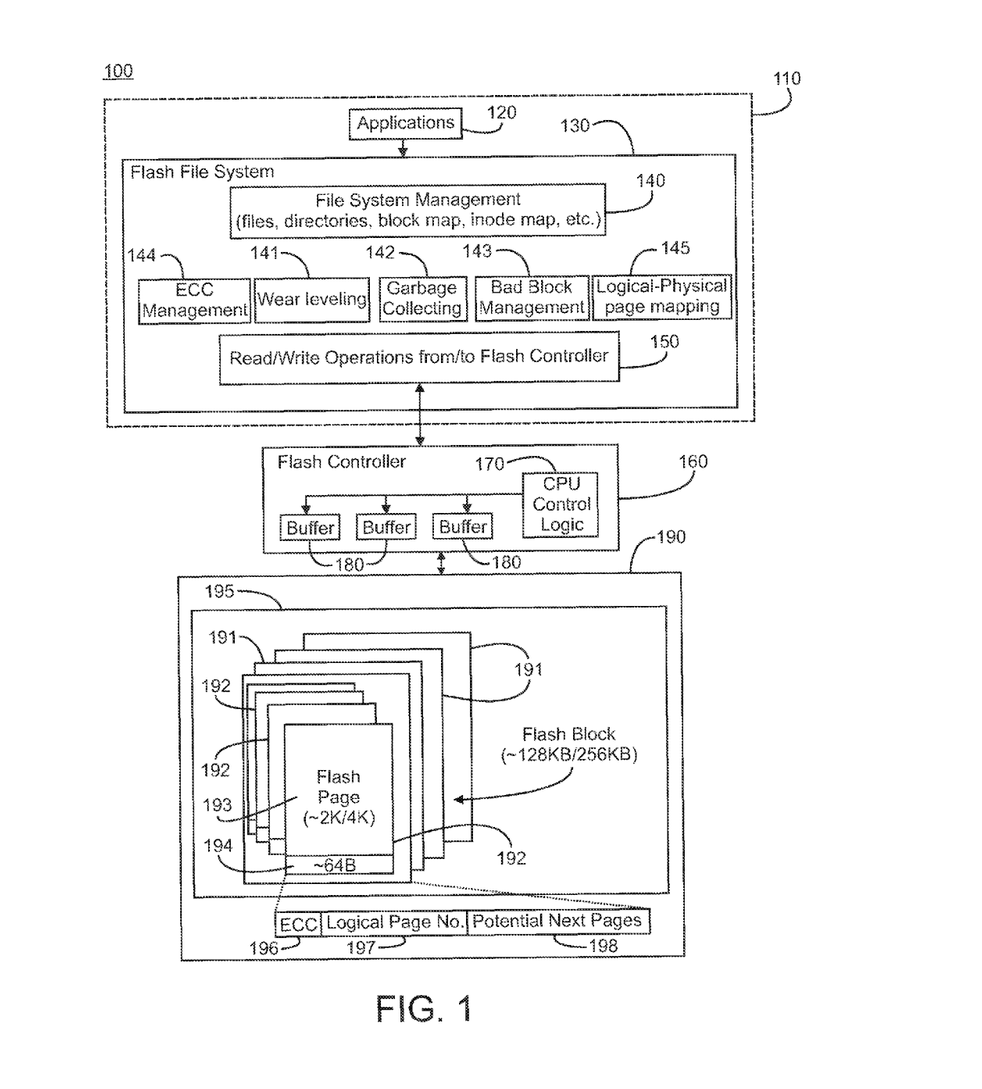
FIG. 1 is a schematic representation of an embodiment of a flash file system for use in storing access patterns in accordance with the present invention.

Referring initially to FIG. 1, a system 100 capable of logging and persisting access pattern information in accordance with the present invention is illustrated. As illustrated, the system is a flash-based file system; however, the present invention is not limited to use with a flash-based file system, i.e., a file system using flash memory devices, and can be used with any type of memory system to which data can be written to, read from and persisted. The system includes a computing system 110. Suitable computing systems are known and available in the art and include distributed computing systems. In general, the computing system includes the computers, servers and other processes necessary to host a plurality of applications 120. These applications run on the computing system and utilize one or more blocks of virtual memory within the computing system. As is known in the art, the virtual memory provides a plurality of logical memory addresses that are used by the applications.

The computing system also includes an instance of a flash memory file system 130 running on the computing system 110. In one embodiment, the flash memory file system runs on the host computing system. Alternatively, the flash file system is embedded in a device such as smart phone or tablet computer. The flash memory file system is configured to monitor accesses to the logical pages of memory in the computing system by the applications. The flash memory file system provides for file system management 140 and facilitates communications 150, i.e., reads and writes, between applications running on the computing system and one or more flash memory devices 190 through a flash controller 160. In addition to providing normal file system semantics, the flash memory file system also performs functions such as wear-leveling 141, garbage collection 142, which refers to re-cycling of blocks with invalid pages, bad block management 143, which is identifying and preventing storage on defective blocks, and error-correcting circuit (ECC) verification 144, potentially, based on the controller. The flash memory file system also maps logical memory addresses or logical memory pages from virtual memory to physical memory addresses or physical memory pages 145 in the flash memory devices. As every write needs to go to a different location in flash memory, i.e., the same page cannot be over-written and the new write will be to an erased page, the flash memory file system maintains and stores this logical-physical mapping {L P}. The logical-physical mapping is updated on every write of data to flash memory. Wear-leveling is an important determinant to this mapping.

The memory controller 160 is in communication with the flash memory file system 130. Included in the flash memory controller is a plurality of memory buffers 180 and a logical control unit 170 configured to execute memory control logic. The flash file system interacts with the flash controller to read and write data to a flash device containing flash memory. The flash controller includes at least two buffers and can have three or more buffers. Multiple buffers enable the flash controller to read the next page from the flash device into one of the buffers while the flash file system is simultaneously reading a page from another buffer of the flash controller, speeding the read and write process. Similarly, the multiple buffers allow parallelism in writes as well.

The flash-based file system includes at least one flash memory device 190 containing flash memory in communication with the flash memory controller and controlled by the logical control unit. The flash memory in the flash memory device is divided into planes 195. Each plane includes a set of blocks 191, and each block provides either about 128 KB or about 256 KB of memory. Each block includes a set or plurality of flash memory pages 192. Each flash memory page has an associated physical memory address and includes a main data area 193, with a capacity of about 2K or about 4K, and a spare area 194, with a capacity of about 64 B. Data are written to and read from the flash memory device in the granularity of pages. In order to write to a page, that page must be erased. Erase operations can only be done at block granularity. Another important aspect of flash memories is the wearing behavior. Flash memory has a finite number of erase-write cycles. Most commercially available products guarantee a life-span of about $10^5$ (100,000) write-erase cycles. Wear-leveling algorithms are used inside the flash file system to spread the erase operations across the flash memory device in an attempt to increase its lifespan. The flash memory file system uses part of the spare area to store information such as ECC information 196 and the logical page number or the logical address information 197 for that page. In addition, the flash memory file system uses the spare area to store access information for patterns of access to the computing system memory. While the spare area can be used to store different kinds of access information, in one embodiment, the flash memory file system stores potential next pages 198 that may be accessed.

Therefore, the flash memory file system 130 is configured to monitor multi-stream, non-linear, non-strided access patterns to logical memory addresses in the virtual memory and to identify ordered pairs of consecutive logical memory addresses in these access patterns. Each order pair includes a first logical memory address and a subsequent second logical memory address in a given access pattern or access stream through the logical memory addresses in the computing system memory. The flash memory file system 130, using, for example, its logical-physical page mapping functionality, maps each first logical memory address to a first physical memory address in the flash memory and the second logical memory address to a second physical memory address in the flash memory. Then the flash memory file system uses the flash memory controller to write data from a given application to a main area of each first physical memory address of the flash memory and an associated second physical memory address to a spare area of each first physical memory address using a conventional memory write. In one embodiment, the flash memory file system is further configured to retrieve from each first physical memory address the data and the associated second physical memory address from the flash memory and to use the flash memory controller to pre-fetch data stored at the associated second physical memory address into one of the plurality of memory buffers.

Figure 2:
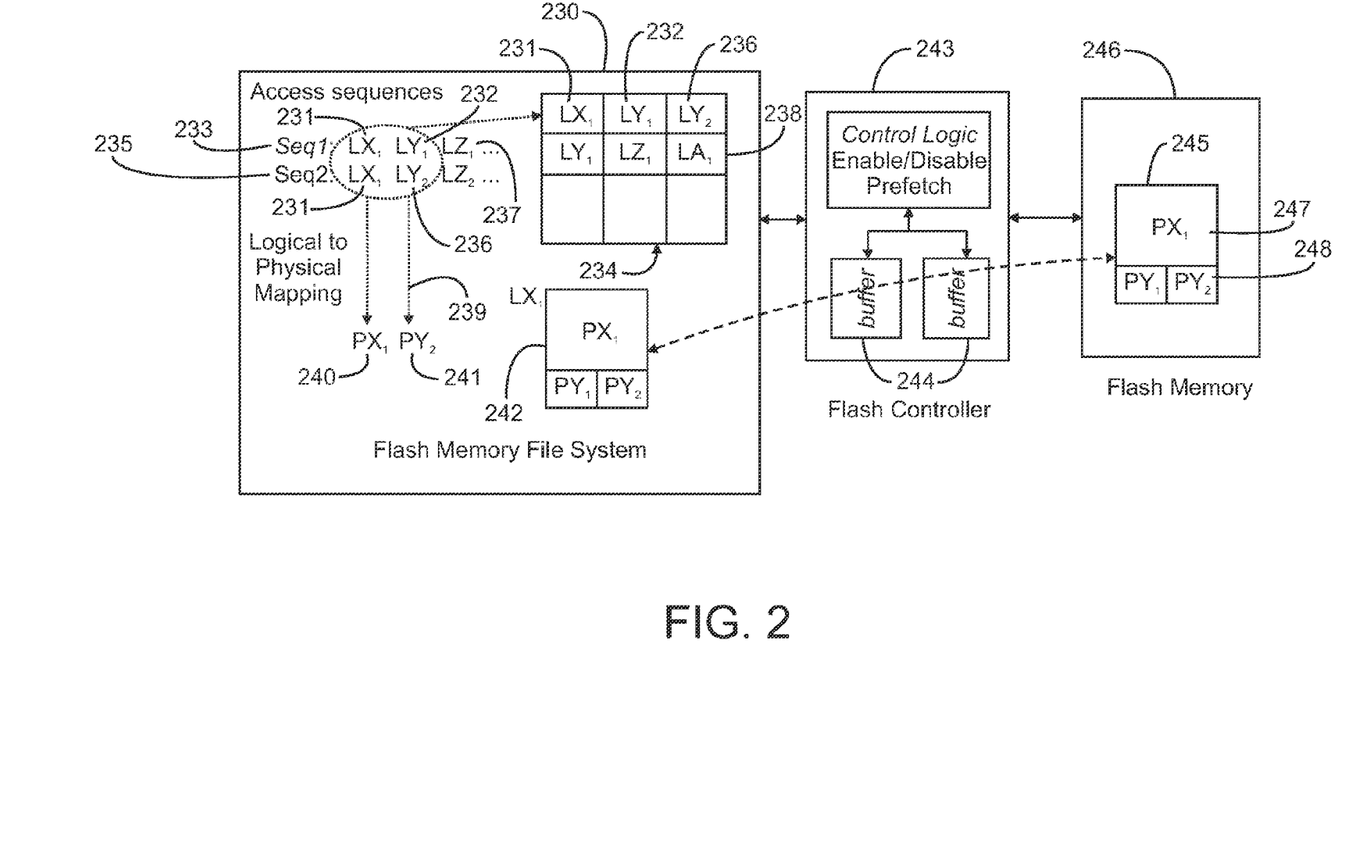
FIG. 2 is a schematic representation of an embodiment of mapping physical pages from the flash file system to the flash memory in accordance with the present invention.

Referring to FIG. 2, when the flash memory file system 230 accesses a first logical page 231, LX1, followed by a second logical page LY1 232, this is an ordered pair in a first memory access pattern or data access stream 233. The monitoring unit of the flash memory file system logs this pair {LX1, LY1} in a table 234 that is stored in the computing system memory. The number of entries in this table can be tuned and controlled by a policy, for example least recently used (LRU). At a later point, a second data access pattern or data access stream 235 is monitored and logged that includes the same first logical page 231, LX1, followed by an alternative or different second logical page 236, LY2. Therefore, the same first logical page, depending on the access stream, can have two different second logical pages, and the monitoring unit adds the alternative second logical page LY2 to the table 234 as one of a list of 'potential next pages' of the first logical page, LXI. As the access stream will continue to a third logical page 237, LZ1, from one of the second logical pages 232, this second logical page can also represent a first logical page in a subsequent ordered pair of logical pages and can also be stored as a separate row 238 in the table 234.

Each logical page has an associated logical memory address. For example, each first logical page has a first logical memory address and each second logical page has an associated second logical memory address. In ordered for data to be stored or persisted in a memory device such as a flash memory device, each logical memory address has to be associated with or mapped to a physical memory address within the memory device. In the case of flash memory, each logical memory address is mapped to a physical page of flash memory and the physical memory address associated with that page. Therefore, the flash file memory system maps 239 the logical memory addresses for logical pages in the access patterns to physical memory addresses 240, 241 corresponding to physical pages in the flash memory. When the file system receives a request from one of the applications running on the computing system to write data to a given logical memory address, LX1, the file access system checks the table 234 to see if there is a "potential next access" stored for this first memory address, LX1, i.e., is this a first logical memory address in any ordered pair of memory addresses identified from an access pattern and logged into the table. As illustrated, the table returns with a tuple (LY1, LY2) of second logical memory addresses derived from multiple access streams. The flash memory file system maps the first logical memory address to a physical address 240 and determines the physical memory addresses for the two second logical memory addresses LY1 and LY2. This tuple (PY1, PY2) is associated with the physical memory address of the first logical memory address 242. If the second logical pages LY1, LY2 are also being written at the same time, the flash memory file system retrieves the latest physical memory address PY1, PY2 that has been assigned to each logical memory address, LY1, LY2, for example from the flash memory file system I/O queue.

The flash memory file system then uses the flash controller 243 to write the requested data and all second physical memory addresses through one of its buffers 244 to the appropriate physical page 245 of flash memory 246. The data are written to the main area 247 of the physical page, and the second memory addresses are concurrently written to the spare area 248 of the physical page. At a later point, when the first logical page, LX1, which has been translated to the first physical page or first physical memory address, PX1, is read from the flash memory 246, the flash controller 243 determines that the spare area of the first physical page PX1 contains two second physical page addresses, (PY1,PY2), also in the flash memory. Therefore, the content of one or both of those two second physical memory addresses is pre-fetched into the other buffers of the flash controller in parallel with the transfer of data into the host computing system memory from the first buffer. The flash controller can choose to do this only when there is no other request already pending from the host computing system. In other words, the flash controller is configured to enable or disable this mode of pre-fetching. The flash memory file system might choose to disable this mode of pre-fetching in the flash controller and explicitly use the access information stored in the spare area to initiate fetches.

Figure 3:
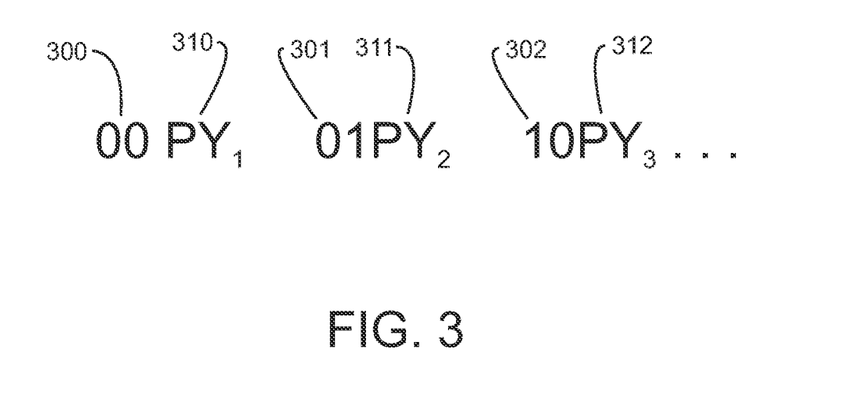
FIG. 3 is a representation of an embodiment of associating bitmaps with physical memory addresses of next accessed pages.

In one embodiment, the flash file system or the flash controller can start or stop pre-fetches based on the nature of the accesses, i.e., reads or writes. Several variations of policies are possible. Flash controllers that have more memory can choose to implement more sophisticated policies for pre-fetching. The pre-fetched pages may become useful data to the file-system, thus reducing the latency of access. In one embodiment, more than two "potential next pages" can be stored in the spare area. Exemplary embodiments in accordance with the present invention facilitate storing access information for a plurality of concurrent and separate access patterns or access streams through the computing system memory. Referring to FIG. 3, differentiation among the plurality of access streams and the second physical memory addresses 310, 311, 312 associated with each one of those access streams is accomplished using a unique bitmap 300, 301 302 associated and stored with each second physical memory address. Each bitmap identifies a given access stream. In one embodiment, a bitmap that is prefixed to each second physical memory address indicates the 'current active stream' so that the flash controller pre-fetches only that page. Therefore, variations such as storing multiple "potential next pages", multiple streams using bitmaps and controlling pre-fetching using a state diagram to monitor the hit rate are all possible. Having such access information can also help develop other tools and utilities to study and construct access pattern graphs. For example, pattern mining tools may be developed to analyze underlying data access patterns and understand pattern evolution over a period of time by periodic mining/analysis.

Figure 4:
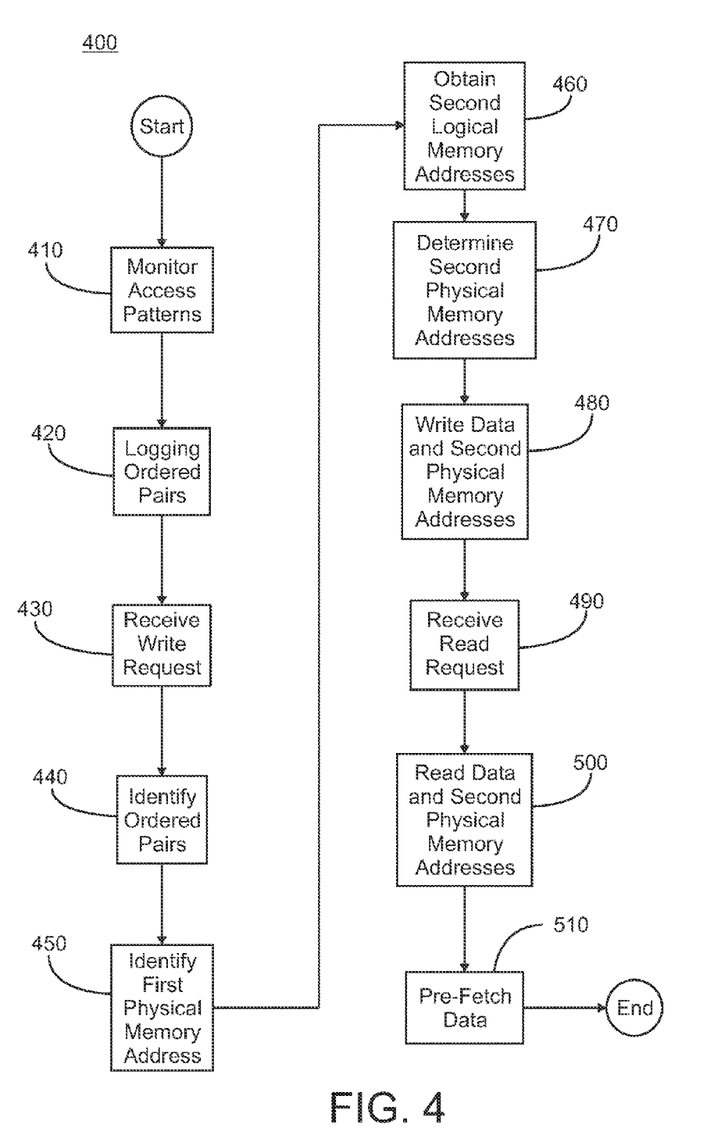
FIG. 4 is a flow chart illustrating an embodiment of a method for storing access patterns in a flash memory in accordance with the present invention.

Referring to FIG. 4, in one exemplary embodiment, the present invention is directed to a method for storing access patterns in a memory system 400 such as a flash memory system. Accesses to logical pages of memory in a computing system by applications running on that computing system are monitored 410. Each logical page has an associated logical memory address, and the accesses taken together define at least one access pattern and potentially a plurality of concurrent access patterns. Each access pattern may correspond to one of the applications running on the computing system, and the accesses include read accesses and write accesses. In one embodiment, the logical pages of memory in the computing system form a block of virtual memory, and the access patterns represent non-linear and non-strided access patterns through the block of virtual memory.

The logical memory addresses are logged or stored in ordered pairs 420. The ordered pairs represent consecutive logical pages in a given access pattern. In one embodiment, logging of the logical memory addresses includes storing the logical memory addresses and mapping of the logical memory addresses to physical memory addresses in a file system such as a flash memory file system. A request is received 430 from one of the applications running on the computing system to write data to a given logical page of memory. One or more ordered pairs of consecutive logical pages containing the logical memory address of the given logical page as a first logical memory address in the ordered pair of logical memory addresses associated with that consecutive pair are identified 440 from the logged ordered pairs. A first physical memory address mapping to the first logical memory address is identified 450. In one embodiment, the first physical memory address is a physical page of flash memory. The physical page of flash memory has a main area and a spare area.

A second logical memory address is obtained from each identified consecutive pair 460, and a second physical memory address mapping to each second logical memory address is determined 470. For flash memories, each second physical memory address corresponds to a second physical page of flash memory that is potentially a next page accessed in a given access pattern. The first and second physical addresses are separate pages in the flash memory. The data and the second physical memory address are written to the first physical memory address 480 using a single conventional memory write. Preferably, the data are written to a main area of the first page of flash memory associated with the first physical memory address, and the second physical memory address is written to a spare area of the first page of flash memory. In one embodiment, a file system, such as a flash memory file system, running on the computing system is used to monitor accesses, to log logical memory addresses, to receive requests, to identifying order pairs, to identify a first physical memory address, to determine a second physical memory address and to write to the first physical memory address.

A read request for data contained in the first physical memory address is received from one of the applications 490, and both the data and the second physical memory address are read from the first physical memory address using a single conventional memory read 500. Data stored at the second physical memory addresses read from the spare area of the first physical memory address are pre-fetched 510 into a memory buffer associated with a separate memory controller in communication with the computing system. In one embodiment, pre-fetching data is selectively disabled.

In one embodiment, accesses to logical pages of memory in a computing system by a plurality of applications running on that computing system are monitored. Each logical page represents a logical memory address, and the accesses taken together form a plurality of separate access patterns through the memory defining a plurality of concurrent access streams. In one embodiment, the logical pages of memory form a block of virtual memory, and each access pattern is a non-linear, non-strided access stream through the block of virtual memory. The logical memory addresses from the monitored access patterns are logged in ordered pairs. Each ordered pair contains consecutive logical pages in each access stream. A request is received from one of the applications running on the host computing system to write data to a given logical page. Based on this request, ordered pairs of consecutive logical pages containing the logical memory address of the given logical page as a first logical memory address in the ordered pair of logical memory addresses associated with those consecutive pairs are identified. In addition, a first physical memory address mapping to the first logical memory address is identified. A second logical memory address is identified from each identified consecutive pair, and a second physical memory address mapping to each second logical memory address is determined. In one embodiment, the memory in the computing system is flash memory, and the first and second physical addresses are separate pages in the flash memory.

In response to a request to write data to the first logical memory address, for example from one of the applications, the data and each second physical memory address is written to the first physical memory address mapping to the first logical memory address using a single conventional memory write. In one embodiment, the memory is flash memory, and the data are written to a main area of a first page of flash memory associated with the first physical memory address. In addition, the second physical memory addresses are written to a spare area of the first page of flash memory. In order to differentiate the second physical memory addresses by access stream, a bitmap is associated with each second logical memory address. Each bitmap is an identification of an access stream associated the ordered pair from its associated second logical memory address was obtained. In addition, each bitmap is associated with a given second physical memory address to which its associated second logical memory address is mapped. Therefore, writing the data and each second physical memory address also includes writing the bitmap associated with each second physical memory address to the first physical memory address.

In one embodiment, a request is received to read data, for example, from the first physical memory address. In response, both the data and the second physical memory addresses from the first physical memory address using a single conventional memory read. In addition, data stored at the second physical memory address are pre-fetched into a memory buffer associated with a separate memory control in communication with the computing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as part of an Operating System (OS) or a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one embodiment, the present invention is directed to a machine-readable or computer-readable storage medium containing a machine-executable or computer-executable code that when read by a machine or computer causes the machine or computer to perform a method for storing access patterns in a memory system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for storing access patterns in a memory system, the method comprising:
    monitoring actual multi-stream accesses to logical pages of memory in a computing system, the actual multi-stream accesses comprising a plurality of simultaneous access patterns associated with applications running on that computing system, each access pattern associated with one of the applications and comprising a sequence of accesses to logical pages in the memory and each logical page comprising a logical memory address;
    logging logical memory addresses in a plurality of ordered pairs, each ordered pair comprising consecutive logical pages in the sequence of accesses in a given access pattern in the actual multi-stream accesses;
    receiving a request to write data to a given logical page;
    identifying a given ordered pair of consecutive logical pages containing the logical memory address of the given logical page as a first logical memory address in the ordered pair of logical memory addresses associated with that consecutive pair;
    identifying a first physical memory address mapping to the first logical memory address;
    obtaining a second logical memory address from that identified consecutive pair;
    determining a second physical memory address mapping to the second logical memory address; and
    writing the data and the second physical memory address using a single conventional memory write to the first physical memory address.

2. The method of claim 1, wherein:
the logical pages of memory comprise a block of virtual memory; and
the access pattern comprises a non-linear access pattern through the block of virtual memory.

3. The method of claim 1, wherein:
the logical pages of memory comprise a block of virtual memory; and
the access pattern comprises a non-strided access pattern through the block of virtual memory.

4. The method of claim 1, wherein the step of monitoring accesses further comprises monitoring read accesses and write accesses to the memory in the computing system.

5. The method of claim 1, wherein the step of receiving a request to write data comprises receiving a request from one of the applications running on the computing system.

6. The method of claim 1, wherein the method further comprises using a file system running on the computing system to monitor accesses, to log logical memory addresses, to receive requests, to identifying order pairs, to identify a first physical memory address, to determine a second physical memory address and to write to the first physical memory address.

7. The method of claim 6, wherein the step of logging the logical memory addresses further comprises storing the logical memory addresses and mappings of the logical memory addresses to physical memory addresses in the file system.

8. The method of claim 6, wherein the file system comprises a flash memory file system.

9. The method of claim 1, wherein:
the memory in the computing system comprises flash memory; and
the first and second physical addresses comprise separate pages in the flash memory.

10. The method of claim 9, wherein the step of writing the data and the second physical memory address further comprises:
writing the data to a main area of a first page of flash memory associated with the first physical memory address; and
writing the second physical memory address to a spare area of the first page of flash memory.

11. The method of claim 1, wherein the method further comprises reading both the data and the second physical memory address from the first physical memory address using a single conventional memory read.

12. The method of claim 11, wherein the method further comprises pre-fetching data stored at the second physical memory address into a memory buffer associated with a separate memory control in communication with the computing system.

13. The method of claim 12, wherein the step of pre-fetching data further comprises selectively disabling pre-fetching into the memory buffer.

14. A non-transient computer-readable storage medium containing a computer-readable code that when read by a computer causes the computer to perform a method for storing access patterns in a memory system, the method comprising:
monitoring actual multi-stream accesses to logical pages of memory in a computing system, the actual multi-stream accesses comprising a plurality of simultaneous access patterns associated with applications running on that computing system, each access pattern associated with one of the applications and comprising a sequence of accesses to logical pages in the memory and each logical page comprising a logical memory address;
logging logical memory addresses in a plurality of ordered pairs, each ordered pair comprising consecutive logical pages in the sequence of accesses in a given access pattern in the actual multi-stream accesses;
receiving a request to write data to a given logical page;
identifying a given ordered pair of consecutive logical pages containing the logical memory address of the given logical page as a first logical memory address in the ordered pair of logical memory addresses associated with that consecutive pair;
identifying a first physical memory address mapping to the first logical memory address;
obtaining a second logical memory address from that identified consecutive pair;
determining a second physical memory address mapping to the second logical memory address; and
writing the data and the second physical memory address using a single conventional memory write to the first physical memory address.

15. The non-transient computer-readable storage medium of claim 14, wherein:
the logical pages of memory comprise a block of virtual memory; and
each access pattern comprises a non-linear, non-strided access stream through the block of virtual memory.

16. The non-transient computer-readable storage medium of claim 14, wherein:
the memory in the computing system comprises flash memory;
the first and second physical addresses comprise separate pages in the flash memory; and
the step of writing the data and the second physical memory address further comprises:
writing the data to a main area of a first page of flash memory associated with the first physical memory address; and
writing the second physical memory address to a spare area of the first page of flash memory.

17. The non-transient computer-readable storage medium of claim 14, wherein the method further comprises:
reading both the data and the second physical memory address from the first physical memory address using a single conventional memory read; and
pre-fetching data stored at the second physical memory address into a memory buffer associated with a separate memory control in communication with the computing system.

18. A flash-based file system comprising:
a computing system hosting a plurality of applications and comprising a virtual memory comprising a plurality of logical memory addresses;
an instance of a flash memory file system running on the computing system, the flash file system configured to monitor accesses to logical pages of memory in the computing system by the applications;
a flash memory controller in communication with the flash memory file system, the flash memory controller comprises a plurality of memory buffers and a logical control unit configured to execute memory control logic; and
a flash memory in communication with the flash memory controller and controlled by the logical control unit, the flash memory comprising a plurality of flash memory pages, each flash memory page comprising a physical memory address;
wherein flash memory file system is further configured to monitor multi-stream, non-linear, non-strided access patterns to logical memory addresses in the virtual memory, each access pattern comprising a given sequence of accesses to logical memory addresses in the flash memory, to identify ordered pairs of consecutive logical memory addresses in each sequence of accesses in the access patterns, each order pair comprising a first logical memory address and a second logical memory address, to map each first logical memory address to a first physical memory address in the flash memory and the second logical memory address to a second physical memory address in the flash memory and to use the flash memory controller to write data to a main area of each first physical memory address and an associated second physical memory address to a spare area of each first physical memory address using a conventional memory write.

19. The system of claim 18, wherein the flash memory file system is further configured to retrieve from each first physical memory address the data and the associated second physical memory address and to use the flash memory controller to pre-fetch data stored at the associated second physical memory address into one of the plurality of memory buffers.

* * * * *